United States Patent
Guillory et al.

(10) Patent No.: US 9,709,979 B2
(45) Date of Patent: Jul. 18, 2017

(54) METHOD OF MONITORING SHORT CIRCUITS IN TORQUE MOTORS

(71) Applicant: SNECMA, Paris (FR)

(72) Inventors: Raphael Tanguy Guillory, Antony (FR); Ghislain Nicolas Emmanuel Sanchis, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/819,581

(22) Filed: Aug. 6, 2015

(65) Prior Publication Data

US 2016/0041550 A1 Feb. 11, 2016

(30) Foreign Application Priority Data

Aug. 8, 2014 (FR) ..................... 14 57718

(51) Int. Cl.
*G01M 15/14* (2006.01)
*G05B 23/00* (2006.01)
(Continued)

(52) U.S. Cl.
CPC ............. *G05B 23/00* (2013.01); *F02C 7/232* (2013.01); *G05B 1/01* (2013.01); *H02P 29/0241* (2016.02); *H02P 31/00* (2013.01)

(58) Field of Classification Search
CPC ................................................ G05B 23/0235
(Continued)

(56) References Cited

U.S. PATENT DOCUMENTS 4,999,552 A * 3/1991 Seipelt ................. H02H 7/0833
318/434

2003/0137265 A1 7/2003 De Frutos
2014/0000352 A1* 1/2014 Gueit ................. G05B 23/0235
73/112.01

FOREIGN PATENT DOCUMENTS

CN 202108811 U 1/2012
EP 2 684 099 A2 1/2014
WO WO 2012/120218 A2 9/2012

OTHER PUBLICATIONS

Search Report issued Jan. 30, 2016 in United Kingdom Patent Application No. GB1513725.0.
(Continued)

*Primary Examiner* — Eduardo Colon Santana
*Assistant Examiner* — Cortez Cook
(74) *Attorney, Agent, or Firm* — Oblon, McClelland, Maier & Neustadt, L.L.P.

(57) ABSTRACT

A method of monitoring an actuator system including a control device, a torque motor having a voltage Umc across its terminals and actuating a servo-valve, and an actuator controlled by the servo-valve, is provided. The control device is suitable for delivering to the torque motor a control current Icmd as a function of a current setpoint I_c and of a measured current Imes. The monitoring method includes: comparing the voltage Umc measured across the terminals of the torque motor with a predetermined threshold voltage Vthresh; and if the voltage across the terminals of the torque motor is less than or equal to the predetermined threshold voltage, raising an alarm and indicating a failure of the servo-valve. The comparison of the voltage Umc is performed only if the control current Icmd is greater than a predetermined threshold current Iinhib, with a control current less than that inhibiting any signaling of a servo-valve failure.

5 Claims, 2 Drawing Sheets

(51) Int. Cl.
  *F02C 7/232*    (2006.01)
  *G05B 1/01*    (2006.01)
  *H02P 31/00*    (2006.01)
  *H02P 29/024*   (2016.01)

(58) Field of Classification Search
  USPC .................. 73/112.01; 701/100; 318/434
  See application file for complete search history.

(56) References Cited

OTHER PUBLICATIONS

French Preliminary Search Report issued May 20, 2015 in French Application 14 57718, filed on Aug. 8, 2014 (with English Translation of Categories of Cited Documents).

* cited by examiner

METHOD OF MONITORING SHORT CIRCUITS IN TORQUE MOTORS

BACKGROUND OF THE INVENTION

The present invention relates to the general field of servo-valve actuator systems for an aircraft turbojet. More particularly, the invention relates to a method of monitoring failures on torque motors in such actuator systems.

A turbojet typically includes servo-valve actuator systems for controlling the various pieces of equipment and members of the engine or its environment that have dimensions, shapes, positions, and/or speeds that need to be modified as a function of detected events or of operating parameters of the engine. By way of example, these may be variable pitch stator vanes for compressor stator stages, compressor bleed valves, or indeed fuel metering valves.

Typically, these actuator systems are controlled by the electronic regulator module of the electronic engine control (EEC) so as to adapt the controlled members to the flight scenario. In known manner, servo-control loops serve to monitor and control actuator systems in which degradation can lead in particular to members of the turbojet taking up positions that do not comply with commands under steady conditions, or to those members responding only slowly to commands under transient conditions.

Such degradations constitute the early stages of failures, since in general they can be compensated initially by the servo-control loops or merely left without being corrected, having no consequence other than reconfiguration (e.g. changing an active control channel).

Nevertheless, after a certain length of time, when such degradations persist and become worse, they can no longer be compensated due to limitations of the control equipment. Thus, degradations can have the consequence of making the turbojet inoperable or inefficient. That can lead to a failure message being issued. Such deteriorations are thus detected too late since they are not detected until the actuator system has failed. A particular type of degradation concerns the torque motors of servo-valves, such as those that can be used for controlling a fuel metering valve. These are actuators that are current controlled by the engine regulator module or computer, with the current supplied to the torque motor controlling the output flow rate from the actuator.

Faults are detected in such actuators on the basis of comparing the control current requested by the computer with the current returned to the computer. Unfortunately, in the event of a differential short circuit (i.e. across the terminals of the torque motor), the current remains unchanged even though there is a failure.

There therefore exists a need to have an effective method of monitoring an actuator system of a turbojet that might be the subject of a failure such as a differential short circuit, in particular in order to be able to issue a maintenance message concerning the actuator system before the turbojet is made inoperable or inefficient.

A similar need exists in the other applications for a servo-valve actuator system.

OBJECT AND SUMMARY OF THE INVENTION

The present invention satisfies the above need by proposing a method of monitoring an actuator system having a control device, a torque motor having a voltage Umc across its terminals and actuating a servo-valve, and an actuator controlled by the servo-valve, the control device being suitable for delivering a control current to the torque motor as a function of a current setpoint and of a measured current, the monitoring method being remarkable in that it comprises the following steps:

comparing the control current Icmd with a predetermined threshold current Iinhib;

if the control current is greater than the predetermined threshold current, comparing the voltage Umc measured across the terminals of the torque motor with a predetermined threshold voltage Vthresh; and if the voltage across the terminals of the torque motor is less than or equal to the predetermined threshold voltage, raising an alarm and signaling a failure of the servo-valve.

Correspondingly, the invention also provides a monitoring device for monitoring an actuator system comprising the control device, a torque motor having a voltage Umc across its terminals and actuating a servo-valve, and an actuator controlled by the servo-valve, the control device being suitable for delivering a control current as a function of a current setpoint and of a measured current, the monitoring device being remarkable in that it comprises:

comparator means for comparing the control current Icmd with a predetermined threshold current Iinhib;

comparator means for comparing the voltage Umc measured across the terminals of the torque motor with a predetermined threshold voltage Vthresh, which means are activated only if the control current is greater than the predetermined threshold current; and means for raising an alarm and signaling a failure of the servo-valve, which means are activated only if the voltage across the terminals of the torque motor is less than or equal to the predetermined threshold voltage.

With the invention, it is thus possible to detect differential short circuits without needing to rely on a possible return of position, and thus locate the failure accurately. This is particularly useful for actuators that do not possess position return, since it is now possible to detect such a failure which used to be undetectable other than by its motor effects. For actuators having such position return, that enables the failure to be detected more quickly, since logic for detecting a failure on a position return requires a longer confirmation time because of the inertia in the servo-control channel, which does not apply to direct electric measurements of the voltage Umc and of the control current Icmd, as proposed.

In an embodiment, the actuator system is a fuel metering valve and the control device may include a proportional-integral-derivative regulator.

In a particular embodiment, the various steps of the monitoring method are determined by computer program instructions.

Consequently, the invention also provides a computer program on a data medium, the program being suitable for being performed in a monitoring device or more generally in a computer, the program including instructions adapted to performing steps of a monitoring method as described above.

The program may use any programming language, and may be in the form of source code, object code, or intermediate code, such as in a partially compiled form or in any other desirable form.

The invention also provides a computer readable data medium storing a computer program and including instructions of a computer program as mentioned above.

The data medium may be any entity or device capable of storing the program. For example, the medium may comprise storage means, e.g. a compact disk read only memory (CD ROM) or a microelectronic circuit read only memory (ROM), or indeed magnetic recording means, e.g. a floppy disk or a hard disk.

Furthermore, the data medium may be a transmissible medium such as an electrical or optical signal, which may be conveyed via an electrical or optical cable, by radio, or by other means.

Alternatively, the data medium may be an integrated circuit in which the program is incorporated, the circuit being adapted to be executed or to be used in the execution of the method in question.

BRIEF DESCRIPTION OF THE DRAWINGS

Other characteristics and advantages of the present invention appear from the following description made with reference to the accompanying drawings, which show an embodiment having no limiting character, and in which.

DETAILED DESCRIPTION OF AN EMBODIMENT

As described above, the invention relates to monitoring servo-control channels in servo-valve actuator systems. In the presently-described embodiment, it is a servo-control channel of an actuator system controlling the position of a fuel metering valve (FMV) of an aircraft that is to be monitored.

Nevertheless, this assumption should naturally not be considered in any way to be limiting, the actuator system could equally well correspond, for example, to controlling:
the position of a variable geometry member;
the positions of bleed valves in a turbojet compressor, such as systems for actuating variable bleed valves (VBVs) and transient bleed valves (TBVs);
the pitch angles of stator vanes in a turbojet having variable stator vanes (VSVs);
the clearance at the tips of blades in a high pressure or a low pressure turbine, such as high pressure turbine active clearance control (HPTACC) or low pressure turbine active clearance control (LPTACC).

In addition, the invention also applies to other servo-valve actuator systems, in particular building machines, industrial robots, . . . .

Figure 1:
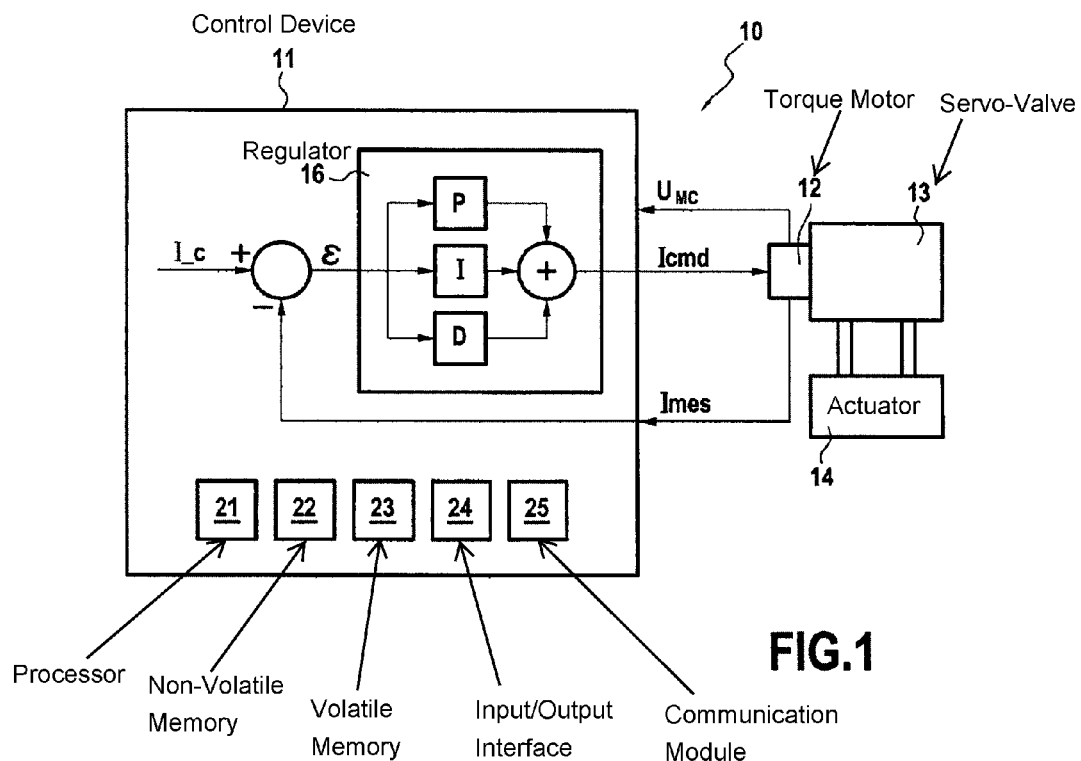
FIG. 1 shows a turbojet actuator system.

FIG. 1 shows an actuator system 10 controlling the position of a turbojet fuel metering valve. The actuator system comprises a control device 11, a torque motor 12, a servo-valve 13, and an actuator 14. The position of the actuator 14 as measured by a sensor (not shown) influences the flow rate of fuel delivered by the fuel metering valve (not shown). It is controlled by the servo-valve 13, itself controlled by the control device 11. More precisely, the torque motor 12 of the servo-valve 13 adapts the hydraulic power delivered to the actuator 14 as a function of an electrical control current Icmd that it receives from the control device 11.

The voltage measured across the terminals of the torque motor 12, written Umc, and a measurement of the control current, written Imes, are returned to the control device 11.

The control device 11 and the torque motor 12 form a servo-control loop. The control device determines the difference $\epsilon$ between the measured current Imes and a current setpoint, written I_c. The difference $\epsilon$ is supplied to a regulator 16, e.g. of the proportional-integral-derivative type, which determines the control current Icmd.

The control device 11 may be a specific wired system of the field-programmable gate array (FGPA) type or preferably the engine control unit (ECU) of the turbojet, which incorporates an EEC regulator unit, also referred to as a full authority digital engine control (FADEC) of the aircraft. It has the hardware architecture of a computer. In particular, it comprises a processor 21, a non-volatile memory 22, a volatile memory 23, an input/output interface 24, and a communication module 25.

The processor 21 serves to execute computer programs stored in the non-volatile memory 22, while making use of the volatile memory 23. The input/output interface 24 serves firstly to acquire measurement signals, in particular the measurement Imes of the control current Icmd, and also to issue control signals, in particular the control current Icmd. The communication module 25 serves to exchange data with other entities, in particular external maintenance equipment.

In an embodiment, the current setpoint I_c and the difference $\epsilon$ are determined, and the function of the regulator 16 is performed by means of a control program stored in the non-volatile memory 22 and executed by the processor 21.

Figure 2:
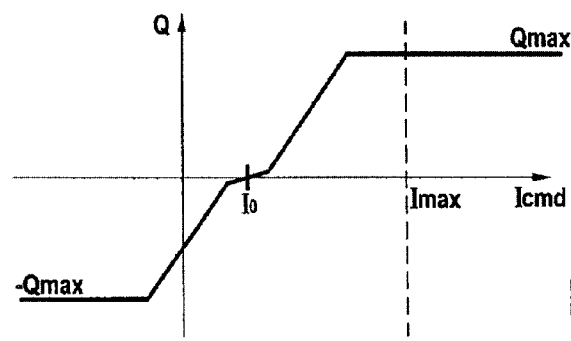
FIG. 2 is a graph plotting an operating curve of a servo-valve.

FIG. 2 is a graph showing an operating curve of a servo-valve. More precisely, this graph shows how the hydraulic flow rate Q delivered by the servo-valve 13 to the actuator 14 varies as a function of the control current Icmd applied to the torque motor 12. In this figure, Imax represents the maximum value of the control current Icmd that the ECU is capable of supplying. The curve corresponds to a nominal state of the servo-valve and shows that the rest current of the servo-valve, i.e. the control current for the torque motor that is needed to hold the actuator in a determined position, presents a value $I_0$ that is not zero. In the nominal state, the current Imax nevertheless enables the maximum hydraulic flow rate Qmax to be supplied.

Figure 3:
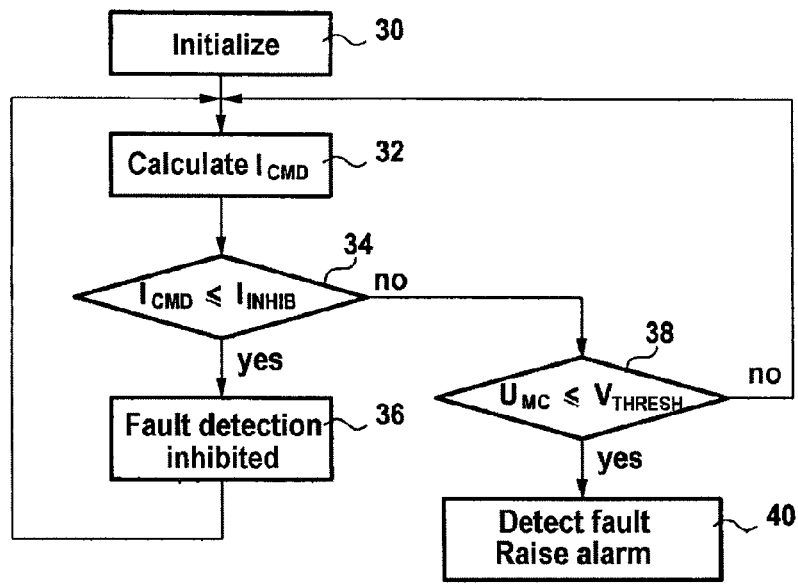
FIG. 3 is in the form of a flow chart showing the main steps of a monitoring method in accordance with the invention.

With reference to FIG. 3, there follows a description of a monitoring method in accordance with the invention for determining whether there is a short circuit in the torque motor 12 of the servo-valve 13. The monitoring method is performed by the control device 11, which thus also constitutes the monitoring device in accordance with the invention, and it begins with an initialization step 30 in which first acquisitions of appropriate magnitudes are acquired followed, in a step 32, by the regulator 16 proceeding to calculate Icmd, which depends on various conditions, for example whether the aircraft is on the ground (which is typically indicated by the value of a computer variable known as "weight on wheel" (WOW)), or whether the engine speed N is constant, e.g. equal to idling on the ground.

The value obtained is a mean value of the current in a stabilized state corresponding to the rest current of the servo-valve. When a stabilized state is detected, the measured current Imes is constant and equal to the setpoint I_c. The control current Icmd thus serves simply to maintain a constant current. With a proportional-integral-derivative regulator, as shown by way of example, this value is equal to the integral current of the regulator.

Step 34 is a first test used to determine whether the control current Icmd as previously calculated is less than or equal to a current Iinhib corresponding to uncertainty about the accuracy with which voltage and current measurements are made, constituting a potential source of measurement errors. More precisely:

$$Iinhib=dUmc/Zmin+dIcmd$$

with Zmin being the (constant) minimum impedance of the torque motor of the actuator and dUmc and dIcmd being the inaccuracies in the respective measurements of the voltage Umc and of the current Icmd.

If this test produces a positive result, then in a following step 36, fault detection is inhibited until the next cycle (since the requested current setpoint does not make it possible to have a voltage Umc that is high enough to be able to depart from the range of inaccuracy for reading Umc) without any maintenance message being issued, and the method returns to step 32 of calculating the control current Icmd. In contrast, if the response is negative, then an additional test is performed in a step 38 in which the voltage Umc is compared with a voltage threshold Vthresh.

If Umc is greater than Vthresh, that means that the torque motor 12 is operating normally and the method can thus return to step 32 to continue monitoring the servo-valve, but without sending a maintenance message.

In contrast, if Umc is less than or equal to Vthresh, that means that the torque motor has suffered a failure that makes use of the servo-valve 13 unacceptable. The monitoring method thus terminates in a step 40, during which a maintenance message is generated.

By way of example, the maintenance message may be stored in the non-volatile memory 22 and then communicated subsequently to maintenance equipment, by means of the communication module 25.

The value of Vthresh is a function of the minimum impedance Zmin, of the control current Icmd, and of the inaccuracies dUmc and dIcmd concerning the voltage and the current, and for the purpose of maximizing the chances of detecting a failure, it must be selected using the following formula:

$$Vthresh<Zmin*(Icmd-dIcmd)-dUmc$$

Figure 4:
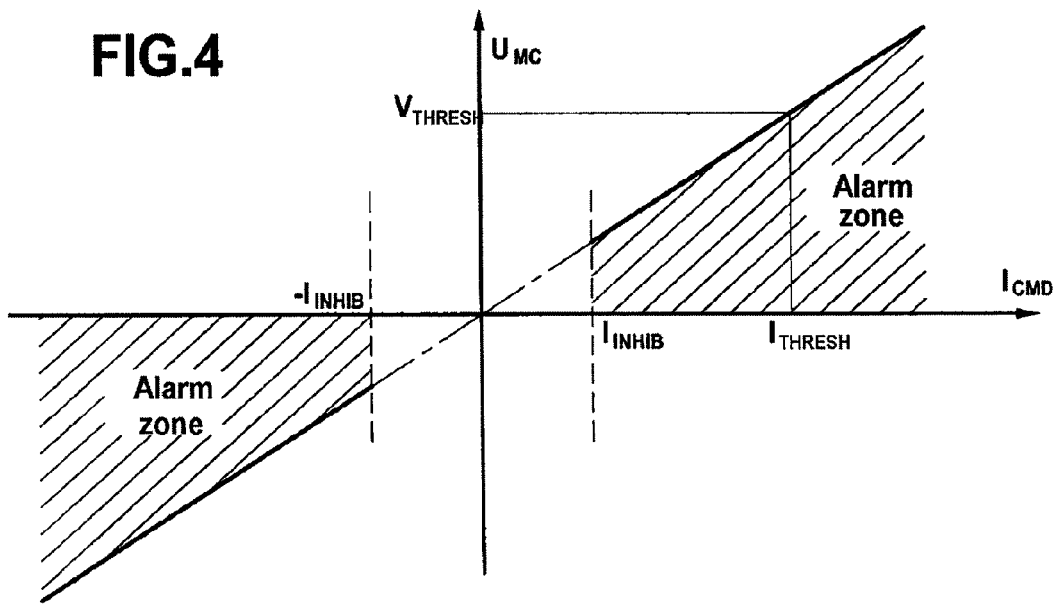
FIG. 4 is a graph showing how the failure detection threshold varies as a function of the control current applied to the servo-valve.

This threshold value, which defines an alarm zone, thus depends only on the control current Icmd, which has a value that changes over time. It therefore needs to be recalculated continuously and it takes the form shown in FIG. 4, with the zone around zero (between −Iinhib and +Iinhib) being excluded because of the above-mentioned measurement inaccuracies.

The invention claimed is:

1. A method of monitoring an actuator system comprising a control device, a torque motor having a voltage Umc across terminals of the torque motor and actuating a servo-valve, and an actuator controlled by the servo-valve, the control device being suitable for delivering to the torque motor a control current Icmd as a function of a current setpoint I_c and of a measured current Imes, the monitoring method comprising:
comparing, using the control device, the control current Icmd with a predetermined threshold current Iinhib;
inhibiting any signaling of a servo-valve failure, only when the control current Icmd is less than or equal to the predetermined threshold current Iinhib;
comparing, using the control device, the voltage Umc measured across the terminals of the torque motor with a predetermined threshold voltage Vthresh, only when the control current Icmd is greater than the predetermined threshold current Iinhib; and
raising an alarm and indicating a failure of the servo-valve, only when the voltage Umc measured across the terminals of the torque motor is less than or equal to the predetermined threshold voltage Vthresh,
wherein the predetermined threshold current is determined using the following formula:

$$Iinhib=dUmc/Zmin+dIcmd$$

with Zmin being a minimum impedance of the torque motor, and dUmc and dIcmd being inaccuracies in the respective measurements of the voltage Umc across the terminals of the torque motor and the current Icmd.

2. The monitoring method according to claim 1, wherein the predetermined threshold voltage is obtained by the following formula:

$$Vthresh<Zmin*(Icmd-dIcmd)-dUmc$$

with Zmin being a minimum impedance of the torque motor and dUmc and dIcmd being inaccuracies in the respective measurements of the voltage Umc across the terminals of the torque motor and the control current Icmd.

3. A non-transitory computer readable storage medium storing a computer program including instructions for executing steps of the monitoring method according to claim 1.

4. A monitoring device for monitoring an actuator system comprising a control device, a torque motor having a voltage Umc across terminals of the torque motor and actuating a servo-valve, and an actuator controlled by the servo-valve, the control device being suitable for delivering to the torque motor a control current Icmd as a function of a current setpoint I_c and of a measured current Imes, the monitoring device comprising:
comparator means for comparing the control current Icmd with a predetermined threshold current Iinhib;
inhibiting means for inhibiting any signaling of a servo-valve failure, which means are activated only when the control current Icmd is less than or equal to the predetermined threshold current Iinhib;
comparator means for comparing the voltage Umc measured across the terminals of the torque motor with a predetermined threshold voltage Vthresh, which means are activated only when the control current Icmd is greater than the predetermined threshold current Iinhib; and
means for raising an alarm and signaling a failure of the servo-valve, which means are activated only when the voltage Umc across the terminals of the torque motor is less than or equal to the predetermined threshold voltage Vthresh,
wherein the predetermined threshold current is determined using the following formula:

$$Iinhib=dUmc/Zmin+dIcmd$$

with Zmin being a minimum impedance of the torque motor, and dUmc and dIcmd being inaccuracies in the respective measurements of the voltage Umc across the terminals of the torque motor and the current Icmd.

5. The monitoring device according to claim 4, wherein said actuator system is a fuel metering valve and said control device includes a proportional-integral-derivative regulator.

* * * * *